3,779,956
PROCESS FOR REDUCING FLAMMABILITY OF POLYURETHANE FOAMS

Edward L. Morehouse, New City, N.Y., assignor to Union Carbide Corporation, New York, N.Y.
No Drawing. Original application Dec. 24, 1969, Ser. No. 888,067, now Patent No. 3,686,254. Divided and this application Apr. 12, 1972, Ser. No. 243,454
Int. Cl. C08g 22/44
U.S. Cl. 260—2.5 AH         11 Claims

ABSTRACT OF THE DISCLOSURE

This invention relates to the use of modified siloxane-polyoxyalkylene block copolymer foam stabilizers in the production of open-cell flexible polyether polyurethane foam having reduced flammability. The block copolymers are modified with certain silicon-bonded organic groups (e.g., $C_6H_5CH_2CH_2$— or bicycloheptyl groups) which increase the bulk surface tension of the block copolymers.

Open-cell flexible polyether polyurethane foams are produced commercially from reaction mixtures containing polyurethane-forming reactants, a catalyst for the reaction of the polyurethane-forming reactants to produce the polyurethane, a blowing agent and a siloxane-polyoxyalkylene block copolymer foam stabilizer. Such foams are, to some extent, flammable and are used in applications (e.g., automobile seat cushions and household furniture cushions) where fire creates a hazard. Accordingly, it is desirable to reduce the flammability of such foams.

This is a division of application S.N. 888,067, filed Dec. 24, 1969, now United States Patent 3,686,254.

This invetion is based, in part, on the discovery that the siloxane-polyoxyalkylene block copolymers used in producing open-cell flexible polyether polyurethane foam can be modified by the incorporation of certain organic groups therein so as to reduce the flammability of the resulting foam. The organic groups which produce this effect are those which increase the bulk surface tension of the siloxane-polyoxyalkylene block copolymer.

This invention provides a process for producing an open-cell flexible polyether polyurethane foam by reacting and foaming a mixture of (a) polyether polyurethane-forming reactants, (b) a catalyst for the reaction of (a) to produce the polyurethane, (c) a blowing agent and (d) a siloxane polyoxyalkylene block copolymer foam stabilizer consisting essentially of (A) at least one siloxane block consisting essentially of siloxane units having the formula:

$$R_a SiO_{\frac{4-a}{2}} \quad (1)$$

wherein $a$ is an integer that has a value from 1 to 3 inclusive, R is a monovalent hydrocarbon group, or a divalent atom or a divalent group that links the siloxane block to a polyoxyalkylene block, said siloxane block containing at least one such divalent atom or divalent group represented by R, and (B) at least one polyoxyalkylene block consisting essentially of oxyalkylene units, the novel feature of which process consists in reducing the flammability of the foam by incorporating in the siloxane block of the block copolymer at least one siloxane unit having the formula:

$$R°_b SiO_{\frac{4-b}{2}} \quad (2)$$

wherein $b$ is an integer that has a value from 1 to 3 inclusive and R° is a monovalent oragnic group that increases the bulk surface tension of the block copolymer.

The groups represented by R° are present in an amount insufficient to cause collapse of the foam. Each polyoxyalkylene block is bonded to a siloxane block by a divalent atom or a divalent group represented by R in Formula 1. The mixtures used in the process of this invention preferably also contain an organic flame retardant.

The presence of the groups represented by R° in the siloxane units represented by Formula 2 in a siloxane-polyoxyalkylene block copolymer reduces the flammability of a polyether polyurethane foam produced therefrom. The groups which have this property are those which increase the bulk surface tension of the block copolymer. Without wishing to be bound by any particular theory, it appears that groups which increase the bulk surface tension of the block copolymer also increase the bulk surface tension of the "parent siloxane." For purposes of this invention, the "parent siloxane" corresponds in composition to the siloxane blocks except that the parent siloxane contains a group (e.g., hydrogen) having little or no effect on the bulk surface tension of the siloxane in place of the divalent atom or divalent group represented by R in Formula 1. The bulk surface tension of the block copolymer and the "parent siloxane" is measured by conventional means (e.g., using a Du Nouy surface tensiometer).

It has been found that, when a high proportion of the siloxane units present in the siloxane blocks of the block copolymers used in this invention are represented by Formula 2, they may raise the bulk surface tension of the copolymer to the extent that the foam collapse. Hence, such units should be present in an amount insufficient to cause collapse of the foam. Preferably, the relative amount of units represented by Formula 2 is such that the bulk surface tension of the block copolymer is increased by from 1 to 6 dynes per centimeter at 25° C. Copolymers containing siloxane blocks having from 50 to 95 mol percent of units represented by Formula 1 above and from 5 to 50 mol percent of units represented by Formula 2 are preferred, especially where R° in Formula 2 has a relatively high molecular weight.

The specific type of unit represented by Formula 2 above incorporated into a block copolymer in order to decrease the flammability of the resulting foam will depend on the desired basic structure of the siloxane block. By way of illustration, when it is desired to provide a block copolymer having siloxane blocks containing a minor amount of dimethylsiloxane units ($Me_2Sio$), a minor amount of methylethylsiloxane units ($C_2H_5MeSiO$) can be incorporated into the siloxane blocks. The latter units increase the bulk surface tension of the block copolymer and decrease the flammability of foams produced using block copolymers containing such siloxane blocks as foam stabilizers. Obviously, when it is desired to provide a block copolymer having siloxane blocks containing a major amount of methylethylsiloxane units, different siloxane units having the desired bulk surface tension increasing property must be incorporated into the block. In general, when the monovalent hydrocarbon groups represented by R in Formula 1 are methyl groups, the desired increase in bulk surface tension can be achieved by incorporating into the siloxane block units represented by Formula 2 wherein R° are alkyl groups containing at least two carbon atoms, aryl groups, cycloalkyl groups, the aralkyl groups, the bicycloheptyl groups, the alkylidene-substituted bicycloheptyl groups, the epoxy-containing monovalent hydrocarbon groups and the halogenated derivatives of the aforementioned groups. These groups preferably contain no more than 12 carbon atoms. Illustrative of such R° groups are the chloromethyl, chloropropyl, bromobutyl, cyclohexyl, phenylethyl, phenylpropyl, ethylidene-norbornenyl, dibromoethylidenenorbornenyl, beta-epoxycyclohexyl and gamma-glycidoxypropyl groups.

The chemical bond between the siloxane block and the oxyalkylene block in the block copolymers used in this invention can be provided by any suitable divalent atom or divalent group [R in Formula 1 above] such as the following: —O—, —S—, —NR—, —R°°—, —R°°O—,

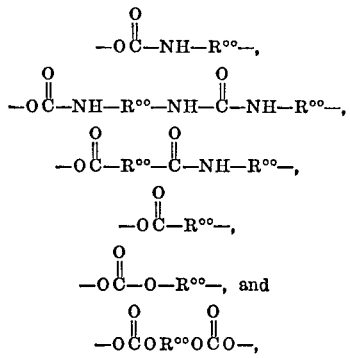

wherein the valence on the left is bonded to a carbon atom of an oxyalkylene unit in the oxyalkylene block, the valence on the right is bonded to a silicon atom in the siloxane block, R is a monovalent hydrocarbon group or hydrogen and R°° is a divalent hydrocarbon group.

Illustrative of the monovalent hydrocarbon groups that are represented by R in Formula 1 are the alkyl groups (for example, the methyl, ethyl, n-propyl, iso-propyl, n-butyl, sec-butyl, isobutyl, t-butyl, n-octyl, decyl, dodecyl groups), the cycloalkyl groups (for example, the cyclopropyl, cyclobutyl, cyclopentyl, cyclohexyl, cycloheptyl groups), and alkenyl groups (for example, the vinyl, allyl, crotyl, 3-butenyl, 1,3-butadienyl allenyl groups) the cycloalkenyl groups (for example, the cyclopentenyl, cyclohexenyl groups), the alkynyl groups (for example, the ethynyl, propargyl groups), the aryl groups (for example, the phenyl, naphthyl, phenanthryl, anthryl groups), the aralkyl groups (for example, the benzyl, 2-phenylethyl, 2-phenyl propyl, cumyl groups), the alkaryl groups (for example, the tolyl, t-butylphenyl, styryl, cyclohexylphenyl groups).

Illustrative of the divalent hydrocarbon groups represented by R in Formula 1 and R°° above are the alkylene groups (e.g., the methylene, ethylene, propylene, 1,2-, 1,3-propylene and butylene groups), the arylene groups, (e.g., the ortho, meta and para phenylene groups) and the alkenylene groups (e.g., the —CH=CH—,

—CH$_2$CH=CHCH$_2$— and —CH$_2$CH$_2$CH=CHCH$_2$— groups).

In the above formulas, the symbols representing the numbers and types of groups need not have the same meaning at each occurrence throughout the composition. For example, in a given block copolymer having groups represented by Formula 1 above, some of such groups can be dimethylsiloxane groups while other of such groups can be methylsiloxane groups and/or trimethylsiloxane groups. Of course, at least one group represented by Formula 2 must be present.

The siloxane units represented by Formula 2 above can be incorporated in the block copolymers used in the process of this invention by any suitable method. By one method (Method 1), a mixture containing (A) a silane having one or more hydrolyzable groups, a group reactive with a reactive polyoxyalkylene polymer and one or more monovalent groups bonded to silicon and (B) a silane having one or more hydrolyzable groups and a group represented by R° in Formula 2 bonded to silicon can be cohydrolyzed and co-condensed to produce a siloxane which can then be reacted with a reactive polyoxyalkylene polymer to produce the block copolymer. By a second method (Method 2), a siloxane containing monovalent groups represented by R in Formula 1 and groups reactive with both (I) a reactive polyoxyalkylene polymer and (II) a precursor for the groups represented by R° in Formula 2 can be reacted with (I) and (II) to produce the block copolymer. In the latter illustration, (I) and (II) can be reacted with the siloxane concurrently or in any sequence. By a third method (Method 3), a siloxane containing silicon-bonded R groups and groups reactive with a reactive polyoxyalkylene polymer can be equilibrated with siloxanes containing silicon-bonded R° groups to produce a siloxane containing these various groups. The latter siloxane can then be reacted with a reactive polyoxyalkylene polymer to produce the block copolymer. By way of illustrating Method 1, a mixture of methyldichlorosilane (MeSiHCl$_2$), dimethyldichlorosilane (Me$_2$SiCl$_2$)

trimethylchlorosilane (Me$_3$SiCl) and beta-phenylethyl (methyl)dichlorosilane (C$_6$H$_5$CH$_2$CH$_2$SiMeCl$_2$) can be cohydrolyzed and co-condensed to produce a siloxane which then can be reacted with an alkenyl endblocked polyoxyalkylene polymer in the presence of an addition catalyst (e.g., chloroplatinic acid) to produce the block copolymer. By way of illustrating Method 2, a siloxane having the formula Me$_3$SiO(Me$_2$SiO)$_r$(MeSiHO)$_s$SiMe$_3$ where $r$ and $s$ are integers can be reacted with an alkenyl endblocked polyoxyalkylene polymer and an aralkenyl compound (e.g., styrene or alpha-methyl styrene) in the presence of an addition catalyst to produce the block copolymer. By way of illustrating Method 3, a siloxane having the formula Me$_3$SiO(Me$_2$SiO)$_r$(MeSiHO)$_s$SiMe$_3$ where $r$ and $s$ are integers can be equilibrated with a cyclic siloxane having the formula (aralkyl-SiMeO)$_t$ in the presence of an equilibration catalyst to produce a siloxane which then can be reacted with an alkenyl endblocked polyoxyalkylene polymer in the presence of an addition catalyst to produce the block copolymer. Still other methods for incorporating groups represented by Formula 2 in the copolymers will be apparent to those skilled in the art.

As noted above, the block copolymers employed in the process of this invention can be produced by reacting a reactive polyoxyalkylene polymer with a siloxane having a group reactive with the polyoxyalkylene polymer. In such reactions, the nature of these reactive groups determines the structure of the divalent atom or divalent, organic group represented by R in Formula 1 above. These reactions can be illustrated by the following equations:

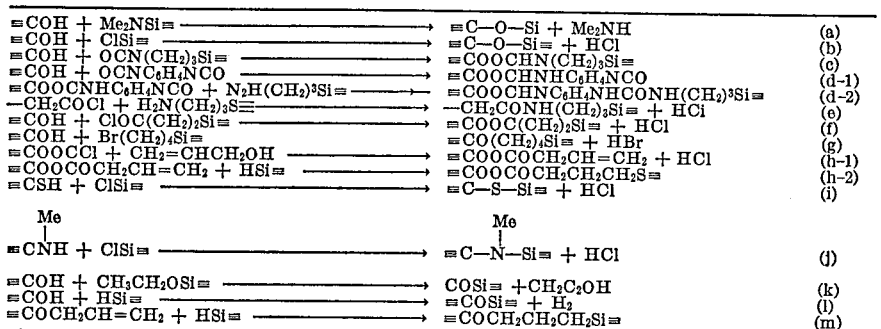

In the above equations, the first reactive group represents a reactive group of the polyoxyalkylene polymer reactant and the second reactive group represents a reactive group of the siloxane reactant. In general, the known reaction conditions for effecting the reaction between the reactive group of the above equations can be used when polyoxyalkylene polymer and siloxane reactants containing such reactive groups are employed in producing the compositions used in this invention.

The oxyalkylene portions or "blocks" of the siloxane-oxyalkylene block copolymers employed as surfactants in this invention are composed of oxyalkylene groups represented by the formula:

$$[\text{---R'O---}] \quad (3)$$

wherein R' is an alkylene group. Preferably, each oxyalkylene block contains at least four oxyalkylene groups. Illustrative of the oxyalkylene groups that are represented by Formula 3 are the oxyethylene, oxypropylene, oxy-1,4-butylene, oxy-1,5-amylene, oxy-2,2-dimethyl-1,3-propylene, oxy-1,10-decylene groups and the like. The oxyalkylene portion of the copolymers can contain more than one of the various types of oxyalkylene groups represented by Formula 3. By way of illustration, the oxyalkylene blocks can contain only oxyethylene groups or both oxyethylene and oxypropylene groups, or other combinations of oxyethylene groups and the various other types of oxyalkylene groups represented by Formula 3.

The oxyalkylene portion of the block copolymers employed in this invention can contain various organic end-blocking or chain terminating groups. By way of illustration, the oxyalkylene blocks can contain such end-blocking groups as the hydroxy group, the aryloxy group (such as the phenoxy group), the alkoxy groups (such as the methoxy, ethoxy, propoxy and butoxy groups), acyloxy groups (e.g., the acetoxy and propionyloxy groups), aralkoxy groups, carbamyloxy groups, carbonate groups (e.g., —OCOOCH$_3$) and the like. Also, a single group can serve as an end-blocking group for more than one oxyalkylene chain. For example the glyceroxy group,

can serve as an end-blocking group for there oxyalkylene chains. Trihydrocarbylsiloxy groups (e.g., trimethylsiloxy groups) can also end-block the oxyalkylene chains. Preferred polyoxyalkylene blocks are those represented by the formula:

$$\text{R''''O(C}_2\text{H}_4\text{O)}_m(\text{C}_3\text{H}_6\text{O})_n\text{---} \quad (4)$$

wherein R'''' is hydrogen, an alkyl group, or an acyl group, $m$ has a value from 0 to 100, $n$ has a value from 0 to 100 and $m+n$ has a value from 20 to 200.

Preferred block copolymers for use in the process of this invention are represented by the average formula:

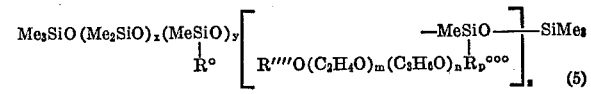

wherein Me is methyl, R°°° is an alkylene group, an -alkylene —CO— group (where the free valence of alkylene is attached to the silicon atom) or an -alkylene —NHCO— group (where the free valence of alkylene is attached to the silicon atom), $x$ has a value from 0 to 200, $y$ has a value from 1 to 100, $z$ has a value from 2 to 30, $p$ is 0 or 1 and R°, R'''', $m$ and $n$ are as defined above for Formulas 2 and 4.

The term "block copolymer" is used herein to denote a material wherein at least one section ("block") of the molecule is composed of recurring monomeric units of one type and at least one other section ("block") of the molecule composed of recurring monomeric units of a different type. The different sections or blocks in the molecule can be arranged in any configuration (e.g., AB, ABA, branched or cyclic). Thus the term "block copolymers" as used herein includes graft copolymers. The block copolymers used in this invention can be discrete chemical compounds. Usually, however, the block copolymers are mixtures of various discrete block copolymeric species. The block copolymers are usually mixtures due, at least in part, to the fact the siloxane and polyoxyalkylene reactants used to produce the block copolymers are themselves usually mixtures.

As used herein, "open-cell" denotes that a flexible foam has interconnecting cells to the extent required to impart adequate breathability for such end uses of the foam as a cushioning material.

The nature of the polyether polyurethane-forming reactants employed in the process of this invention is dictated by the technique (one-shot, prepolymer or quasi-prepolymer) used to produce the foam. When the one-shot or one-step technique is used, the reactants are a polyether polyol and an organic polyisocyanate. When the quasi-prepolymer technique is used, the reactants are a prepolymer (formed by reacting an excess of an organic polyisocyanate and a polyether polyol) and a polyether polyol. When the prepolymer technique is used, the reactants are water and an isocyanato-terminated reaction product of a polyether polyol and a polyisocyanate.

The organic flame retardants that can be employed in the process of this invention can be chemically combined in one of the other of the materials used (e.g., in the polyether polyol, the prepolymer or the quasi-prepolymer) or can be a discrete chemical compound. The flame retardants preferably contain phosphorus or halogen or both phosphorus and halogen. Flame retardants of the discrete chemical compound variety include 2,2-di(bromomethyl)-1,3-propanediol, (ClCH$_2$CH$_2$O)$_3$P(O), 2,3-dibromopropanol, brominated phthalate ester diols (e.g. from tetrabromophthalic anhydride and propylene oxide), oxypropylated phosphoric acid, polyol phosphites (e.g. tris(dipropylene glycol)phosphite), polyol phosphonates (e.g. bis (dipropylene glycol)hydroxymethane phosphonate), tris-(2,3 - dibromopropyl)phosphate, tris(1,3-dichloropropyl) phosphate, tetrabromobisphenol-A, tetrabromophthalic anhydride, 2,4,6 - tribromophenol, pentabromophenol, bis (2,3-dibromopropyl)phosphoric acid or salts thereof, tris (1 - bromo-3-chloroisopropyl)phosphate, bromo anilines and dianilines, di-polyoxyethylene hydroxymethyl phosphonate, O,O - diethyl - N,N-bis(2-hydroxyethyl)aminomethyl phosphonate, di-polyoxypropylene phenyl phosphonate, di-polyoxypropylene chloromethyl phosphonate, di-polyoxypropylene butyl phosphate,

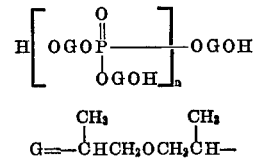

tris(dichloropropyl)phosphine, tetrachlorophthalic anhydride, chlorendic acid and its anhydride, diallyl clorendate, tetrabromoethylene, perchlorobicyclopentadiene, 3,3,3-trichloropropene-1, 1,2-dichloro-2,3-epoxypropane, bis(2,3-dibromopropyl)ether of sorbitol, hexachlorobenzene, tris 4-(1,3-dioxacyclopentyl)methyl phosphite, butyl mono and di acid phosphate, chlorinated maleic anhydride, phosphoramidates, dipentaerythritol phosphite, diethyl phosphite, dipropylene glycol hydrogen phosphite, tris(tetramethylcyclobutanediol)phosphite, dimethyl phosphite, ammonium polyphosphate, polyol phosphates, diethyl 2,3-dihydropropyl phosphonate, dipropylene glycol tetrol diphosphonate, tetrakis-(hydroxypropyl)-2,2-bis(chloromethyl)-1,3 - propanediol-bis-phosphate, dichlorinated adduct of 1 ($\alpha$ - hydroxy - $\beta$-trichloroethyl(dicyclopentadiene, tris-dipropylene glycol phosphite/glucerine-polyoxypropylenetriol adducts, diethyl - 1-hydroxyethylphosphonate, polyoxyethylenephenylphosphonate, oxypropylated phosphoric acid, bis(hydroxymethyl)phosphinic acid, pentachlorophenylbis(polypropylene glycol)phosphate, oxypropylated melamine, and N-COCO-N,N',N'-tris(2 - hydroxyethyl) ethylenediamine.

Those of the above flame retardants of the discrete chemical compound variety which contain groups reactive with hydroxy or isocyanato groups can be used as starters in producing the polyether polyols or can be reacted with organic polyisocyanates to produce modified polyols or polyisocyanates having chemically combined flame retardant groups. Such modified polyethers and polyisocyanates are useful as reactants in the process of this invention. In such cases, due regard must be given to the possible effect of the functionality of the compound on the other properties (e.g., degree of flexibility) of the resulting foam.

The organic polyisocyanates that are useful in the process of this invention are organic compounds that contain at least two isocyanato groups. Such compounds are well known in the art of producing polyurethane foams. Suitable organic polyisocyanates include the hydrocarbon diisocyanates (e.g., the alkylene diisocyanates and the arylene diisocyanates) as well as known triisocyanates.

As examples of suitable polyisocyanates one can mention
1,2-diisocyanatoethane,
1,3-diisocyanatopropane,
1,2-diisocyanatopropane,
1,4-diisocyanatobutane,
1,5-diisocyanatopentane,
1,6-diisocyanatohexane,
bis(3-isocyanatopropyl)ether,
bis(3-isocyanatopropyl)sulfide,
1,7-diisocyanatoheptane,
1,5-diisocyanato-2,2-dimethylpentane,
1,6-diisocyanato-3-methoxyhexane,
1,8-diisocyanatooctane,
1,5-diisocyanato-2,2,4-trimethylpentane,
1,9-diisocyanatononane,
1,10-diisocyanatodecane,
1,6-diisocyanato-3-butoxyhexane,
the bis(3-isocyanatopropyl)ether of 1,4-butylene glycol,
1,11-diisocyanatoundecane,
1,12-diisocyanatododecane,
bis(isocyanatohexyl)sulfide,
1,4-diisocyanatobenzene,
2,4-diisocyanatotoluene,
2,6-diisocyanato tolylene,
1,3-diisocyanato-o-xylene,
1,3-diisocyanato-m-xylene,
1,3-diisocyanato-p-xylene,
2,4-diisocyanato-1-chlorobenzene,
2,4-diisocyanato-1-nitrobenzene,
2,5-diisocyanato-1-nitrobenzene.

The polyether polyols that are useful in the process of this invention are organic compounds containing a plurality of ether linkages and at least two alcoholic hydroxyl groups. The polyoxyalkylene polyols contemplated can be illustrated by the ethylene oxide, 1,2-epoxypropane, and the vicinal epoxy butane adducts of propylene glycol,
1,3-dihydroxybutane,
1,4-dihydroxybutane,
2-methyl-2-ethyl-1,3-propanediol,
1,5-dihydroxypentane,
2-ethylhexanediol-1,3-glycerol,
1,2,4-trihydroxybutane,
1,2,6-trihydroxyhexane,
1,1,1-trimethylolethane,
1,1,1-trimethylolpropane, and the like.

The polyol or polyol mixture employed can have hydroxyl numbers which vary over a wide range. In general, the hydroxyl numbers of the polyols employed in the invention can range from about 30 and lower, to about 120 and higher, preferably, from about 40 to about 80. The hydroxyl number is defined as the number of milligrams of potassium hydroxide required for the complete neutralization of the hydrolysis of the fully acetylated derivative prepared from 1 gram of polyol. The hydroxyl number can also be defined by the equation:

$$OH = \frac{56.1 \times 1000 \times f}{m.w.}$$

where

OH = hydroxyl number of the polyol
$f$ = average functionality, that is average number of hydroxyl groups per molecule of polyol
m.w. = average molecular weight of the polyol.

The amount of polyisocyanate employed will vary slightly depending upon the nature of the polyurethane being prepared. In general, the total —NCO equivalent to total active hydrogen equivalent (i.e., hydroxyl plus water, if water is present) should be such as to provide a ratio of 0.8 to 1.2 equivalents of —NCO per equivalent of active hydrogen, and preferably a ratio of about 1.0 to 1.1 equivalents of —NCO per reactive hydrogen. As used herein, the term "index" denotes the amount of polyisocyanate used as percent of the calculated amount for reaction with total polyol hydroxyl groups and water.

Foaming can be accomplished by employing a small amount of a polyurethane blowing agent, such as water, in the reaction mixture (for example, from about 0.5 to about 5 weight percent of water, based upon total weight of the reaction mixture), or through the use of blowing agents which are vaporized by the exotherm of the reaction, or by a combination of the two methods. All of these methods are known in the art. Illustrative polyurethane blowing agents include halogenated hydrocarbons such as trichloromonofluoromethane, dichlorodifluoromethane, dichloromonofluoromethane, dichloromethane, trichloromethane, 1,1-dichloro - 1 - fluoroethane, 1,1,2-trichloro - 1,2,2 - trifluoromethane, hexafluorocyclobutene, octafluorocyclobutane, and the like. Another useful class of blowing agents include thermally-unstable compounds which liberate gases upon heating, such as N,N'-dimethyl-N,N'-dinitrosoterephthalamide, and the like. The generally preferred method of foaming for producing flexible foams is the use of water or a combination of water plus a fluorocarbon blowing agent such as trichloromonofluoromethane. The quantity of blowing agent employed will vary with factors such as the density desired in the foamed product. In general, however, it may be stated that for 100 grams of reaction mixture containing an average NCO/OH ratio of about 1:1, about 0.005 to 0.3 mole of gas are used to provide densities ranging from 30 to 1 pound per cubic foot respectively. The exact amount of blowing agent used can be determined by routine laboratory experimentation.

Catalysts are ordinarily employed in the reaction mixture for accelerating the isocyanate-reactive hydrogen reaction. Such catalysts include a wide variety of compounds such as, for example: tertiary amines such as N,N-dimethyl-2-[2-dimethylaminoethoxy]ethylamine, trimethylamine, N-methylmorpholine, N-ethylmorpholine, N,N-dimethylbenzylamine, N,N-dimethylethanolamine, N,N,N',N'-tetramethyl - 1,3 - butanediamine, triethanolamine, 1,4 - diazabicyclo[2,2,2]octane ("triethylene diamine"), bis(dimethylaminoethyl)ether, and the like; salts of organic carboxylic acids with a variety of metals such as alkali metals, alkaline earth metals, Al, Sn, Pb, Mn, Co, Ni, and Cu, some of the more important of such salts being, for instance, stannous octoate, stannous acetate, stannous oleate, lead octoate, metallic driers such as manganese and cobalt naphthenate, sodium acetate, potassium laurate, calcium hexanoate, and the like; organometallic derivatives of tetravalent tin, trivalent and pentavalent As, Sb and Bi, and metal carbonyls of iron and cobalt.

The tertiary amines may be used as primary catalysts for accelerating the isocyanate-reactive hydrogen reaction, or as secondary catalysts in combination with the above-noted metal catalysts, in particular, the stannous salts of carboxylic acids or the organometallic tin derivatives. Metal catalysts, or combinations thereof, can also be used as the sole catalysts. The catalysts are employed in small amounts, for example, from about 0.001 weight percent to about 5 weight percent, based on weight of the reaction mixture.

Polyurethane foams are produced in accordance with this invention by any of the conventional processes used to produce polyurethane foams (e.g., the one-shot or one step process or the quasi-prepolymer process). Typically the one-shot process comprises (1) combining at a temperature between about 15° C. and about 50° C. separate mixtures comprising (i) a polyether polyol, the siloxane-oxyalkylene block copolymer, a catalyst and blowing agent, and (ii) an organic isocyanate (or mixture of organic isocyanates) and (2) maintaining the combined mixture at a temperature between about 15° C. and about 50° C. until the foaming reaction commences, (3) pouring the foaming reaction mixture into a suitable mold maintained at between about 15° C. and about 50° C., and (4) curing the resulting foam by heating the foam at a temperature between about 100° C. and about 150° C. The heating step (4) described in the preceding paragraph is not essential, but heating cures the foamed product to a stable, tack-free, resin foam capable of supporting a load within a relatively short period of time (in the order of about five minutes to thirty minutes), whereas longer times are required to obtain a cured, tack-free resin at room temperature. Also, the pouring step (3) is not essential since the mixtures (i) and (ii) can be combined and the foaming reaction commenced and completed in a mold.

The relative amounts of the various other components reacted in accordance with the above-described process for producing polyurethane foams in accordance with this invention are not narrowly critical. The polyether polyol and the polyisocyanate, taken together, are present in the foam formulations (reaction mixtures) used to produce such foams in a major amount. The relative amounts of these two components is the amount required to produce the urethane structure of the foam and such relative amounts are well known in the art. The blowing agent, catalyst and block copolymer are each present in the known amount necessary to achieve the function of the component. Thus, the blowing agent is present in a minor amount sufficient to foam the reaction mixture, the catalyst is present in a catalytic amount (i.e., an amount sufficient to catalyze the reaction to produce the urethane at a reasonable rate) and the block copolymer is present in a foam-stabilizing amount (i.e., in an amount sufficient to stabilize the foam).

Thus, the amount of the siloxane-polyoxyalkylene block copolymer employed as a foam stabilizer in this invention can vary over wide limits. From about 0.2 weight percent to 5 weight percent or greater of the block copolymer can be used (weight percentages are based on the total weight of the mixture, that is, the polyether polyol, polyisocyanate, catalyst, blowing agent and foam stabilizer). There is no commensurate advantage to using amounts of foam stabilizer greater than about 5 weight percent. Preferably, the amount of siloxane-polyoxyalkylene block copolymer present in the foam formulations varies from about 0.5 weight percent to about 2.0 weight percent.

It is sometimes convenient to form a mixture containing a minor amount of one of the above-described block copolymers and a major amount of one or more of the other materials used in producing polyurethane foams in accordance with this invention. Such mixtures can be stored and used in the process when desired.

The block copolymers used in the process of this invention result in the production of foams having reduced flammability as compared to foams produced from block copolymers free of units represented by Formula 2 above. Moreover, the use of block copolymers containing units represented by Formula 2 entails the further advantage that there is less change in the flammability and breathability of the resulting foams with changes in block copolymer concentration, providing greater operating latitude. High foam breathabilities obtained with these copolymers have made them useful in high density and molded foam systems where tight, splitting foam is a problem.

The polyurethane foams produced in accordance with this invention can be used in the same areas and for the same purposes as conventional flexible polyether polyurethane foams (e.g., they can be used as cushioning materials for seating and for packaging delicate objects, and as gasketing material).

The following examples illustrate the present invention:

In the following examples, the siloxane-polyoxyalkylene block copolymers used in the process of this invention (Copolymers I to XIII inclusive) and the siloxane-polyoxyalkylene block copolymers used for purposes of comparison (Copolymers A to G inclusive) have the following composition:

COMPOSITION OF COPOLYMERS

| Copolymer | Formula [a] | D″ |
|---|---|---|
| I | MD$_{42}$D$_7$D″$_{13}$M | C$_6$H$_5$C$_2$H$_4$SiMeO |
| II | MD$_{40}$D′$_6$D″$_{12}$M | ClC$_3$H$_6$SiMeO |
| III | MD$_{42}$D′$_7$D″$_{20}$M | ClCH$_2$SiMeO |
| IV | MD′$_6$D″$_{60}$M | C$_2$H$_5$SiMeO |
| V | MD$_{50}$D′$_6$D″$_9$M | C$_6$H$_5$C$_2$H$_4$SiMeO |
| VI | MD$_{90}$D′$_8$D″$_{29}$M | OCH$_2$CHCH$_2$OC$_3$H$_6$SiMeO (cyclic) |
| VII | MD′$_6$D″$_{52}$M | (C$_2$H$_5$)$_2$SiO |
| VIII | MD$_{94}$D′$_8$D″$_{24}$M | 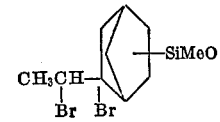 |
| IX | MD$_{96}$D′$_8$D″$_{24}$M | 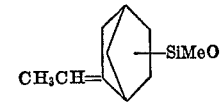 |
| X | MD$_{51}$D′$_{4.9}$D″$_9$M | C$_6$H$_5$C$_2$H$_4$SiMeO |
| XI | MD$_{50}$D′$_{6.1}$D″$_9$M | C$_6$H$_5$C$_2$H$_4$SiMeO |
| XII | MD$_{96}$D′$_{6.5}$D″$_{28}$M | C$_6$H$_5$CH(CH$_3$)CH$_2$SiMeO |
| XIII | MD$_{40}$D′$_{3.3}$D″$_{24}$M | C$_6$H$_5$CH(CH$_3$)CH$_2$SiMeO |
| A | MD$_{33}$D′$_6$D″$_{16}$M | C$_6$H$_5$C$_2$H$_4$SiMeO |
| B | MD$_{90}$D′$_8$D″$_{29}$M | R°°SiMeO [b] |
| C | MD$_{67}$D′$_6$D″$_4$M | (C$_2$H$_5$O)$_2$P(O)OCH$_2$CH$_2$OC$_3$H$_6$SiMeO |
| D | MD′$_6$D″$_{49}$M | ClCH$_2$SiMeO |
| E | MD$_{72}$D′$_{4.9}$M | |
| F | MD$_{72}$D′$_{6.1}$M | |
| G | MD$_{121}$D′$_{23}$D″$_{33}$M | C$_7$F$_{15}$CH$_2$OC$_3$H$_6$SiMeO |

[a] In the formulas, the symbols have the following meanings: M denotes the Me$_3$SiO$_{0.5}$ group; D denotes the Me$_2$SiO group; D′ denotes the group MeO(C$_3$H$_6$O)$_{29}$(C$_2$H$_4$O)$_{20}$C$_3$H$_6$SiMeO; Me denotes the methyl group.
[b] R°° denotes the group

[C$_4$H$_9$CH(C$_2$H$_5$)CH$_2$O]$_2$P(O)OCH$_2$CH(OOCNHMe)CH$_2$OC$_3$H$_6$—

In all cases, the block copolymers were produced from allyl and methoxy endblocked polyethers. Such polyethers contain up to 10 mol percent of allyl and hydroxyl endblocked polyethers as impurities. In some cases (i.e., in the case of the polyethers used to produce Copolymers II, III, IV, VII to XI, A, C, D and F), any such hydroxyl groups were converted to acetoxy endblocking groups by reaction with excess acetic anhydride at about 140° C. followed by volatilization of the excess anhydride and by product acetic acid. Accordingly, the block copolymers produced from the polyethers contained up to 10 mol percent OH or OAc endblocking groups and at least 90 mol percent methoxy endblocking groups on the polyoxyalkylene blocks. For convenience, the block copolymers are depicted in the formulas appearing above as though all the endblockers on the polyoxyalkylene blocks are methoxy groups.

The bulk surface tension measurements indicated in the following examples were obtained with a Du Nouy surface tensiometer. Foam breathabilities were obtained as described in R. E. Jones and G. I. Fesman in the Journal of Cellular Plastics, volume I, No. 1, January 1965.

Examples 1 to 8 below illustrate the preparation of the novel siloxane-polyoxyalkylene block copolymers useful in the process of this invention.

EXAMPLE 1

A hydrosiloxane was prepared by equilibration of a fluid of average composition $$Me_3SiO(Me_2SiO)_{68}(C_6H_5CH_2CH_2SiMeO)_{34}SiMe_3$$

(127.1 g.), a fluid of average composition $$Me_3SiO(MeHSiO)_{38}SiMe_3$$

(16.1 g.), $Me_2SiO$ cyclics (101.0 g.) and $Me_3SiOSiMe_3$ (5.8 g.) using an acid catalyst. Contact time was about ten hours at 25° C., at which time a constant viscosity of 159 centistokes had been reached. When a sample of this fluid was treated with KOH in water/ethanol 23.6 cubic centimeters of hydrogen gas per gram were liberated. The fluid had the average structure $$Me_3SiO(Me_2SiO)_{50}(MeHSiO)_6(C_6H_5C_2H_4SiMeO)_9SiMe_3$$

A mixture of this hydrosiloxane (14.5 g., 0.015 mole of SiH), a polyether of average structure $$MeO(C_3H_6O)_{29}(C_2H_4O)_{20}CH_2CH=CH_2$$

(60.5 g., 0.018 mole of allyl), toluene (32 g.) and chloroplatinic acid (25 parts per million Pt based on reactants) was heated rapidly to 90° C. and stirred ten minutes. All SiH had reacted. Sodium bicarbonate (1 g.) was added, the reaction mixture sparged with nitrogen to 130° C. and filtered. The product, a clear amber liquid, had the average structure:

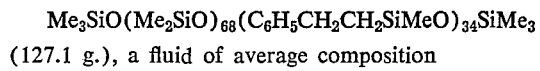

This copolymer is referred to herein as "Copolymer V." In this example and in the following examples, "g." denotes grams and "Me" denotes methyl.

EXAMPLE 2

A solution of a hydrosiloxane of composition $$Me_3SiO(Me_2Sio)_{96}(MeHSiO)_{34}SiMe_3$$

(38.1 g., 0.14 mole of SiH) in toluene (200 g.) was heated to 75° C. chloroplatinic acid (25 parts per million platinum based on reactants) added, then a polyether of composition $$MeO(C_3H_6O)_{29}(C_2H_4O)_{20}CH_2CH=CH_2$$

(88.4 g., 0.027 mole of allyl) was added dropwise at 75°–92° C. The rate of addition was such that the reaction mixture remained clear. A solution of alpha-methylstyrene (20.0 g., 0.17 mole) in 25 g. of toluene, containing chloroplatinic acid (50 parts per million platinum based on reactants), was added dropwise to the solution of siloxane-polyether copolymer at 90° C. over a period of fifteen minutes. After five hours at this temperature all but a trace of the SiH had reacted. Sodium bicarbonate (2 g. was added and the reaction mixture sparged with nitrogen at 140° C. to remove solvent and excess alpha-methylstyrene. The product was a liquid with a viscosity of 4,620 centistokes at 25° C., and had the following average structure:

$$Me_3SiO(Me_2SiO)_{96}[MeO(C_3H_6O)_{29}(C_2H_4O)_{20}$$
$$C_3H_6SiMeO]_{6.5}[C_6H_5CH(Me)CH_2SiMeO]_{28}SiMe_3$$

This copolymer is referred to herein as "Copolymer XII." This copolymer was tested under the same conditions as those in Table I, except that the burning test was ASTM D-1692-59T, which is similar to ASTM D-1692-67T but less stringent. In the —59T test the burner is extinguished when the foam strip has burned one inch. Rise was 7.9 inches, breathability 3.9 ft.³/min. and burning extent only 1.23 inches. Under the same conditions for a copolymer of composition

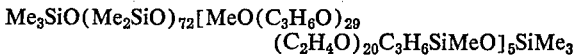

rise was 8.2 inches, breathability 1.8 ft.³/min. but foam burning extent was 2.56 inches. This copolymer is referred to herein as "Copolymer E."

EXAMPLE 3

A mixture of $(EtMeSiO)_3$ (90.0 g.), a fluid of composition $Me_3SiO(MeHSiO)_{38}SiMe_3$ (6.3 g.), $Me_3SiOSiMe_3$ (2.8 g.) and concentrated sulfuric acid (2.0 g.) was stirred 16 hours at room temperature. After neutralization with sodium bicarbonate the reaction mixture was filtered. The product filtrate was a colorless fluid with a viscosity of 102 centistokes at 25° C. and had the following average composition: $Me_3SiO(EtMeSiO)_{60}(MeHSiO)_6SiMe_3$. A mixture of hydrosiloxane (14.6 g., 0.015 mole of SiH), a polyether of composition $$MeO(C_3H_6O)_{29}(C_2H_4O)_{20}CH_2CH=CH_2$$

(76 g., 0.02 mole of allyl), toluene (45 g.) and chloroplatinic acid (25 parts per million platinum based on reactants) was heated at 90° C. for about fifteen minutes. All SiH reacted. Sodium bicarbonate was added, the reaction mixture sparged at 130° C. and filtered. The liquid filtrate was a clear, liquid product having the following average composition:

$$Me_3SiO(EtMeSiO)_{60}[MeO(C_3H_6O)_{29}$$
$$(C_2H_4O)_{20}C_3H_6SiMeO]_6SiMe_3$$

This copolymer is referred to herein as "Copolymer IV."

EXAMPLE 4

Chloromethylmethyldichlorosilane, $ClCH_2SiMeCl_2$ (131 g., 0.8 mole) was added dropwise to a mixture of water (28.8 g., 1.6 mole) and diisopropyl ether (200 g.) at 20–40° C. after a light nitrogen sparge sodium bicarbonate was added incrementally until the reaction mixture was neutralized, then the mixture filtered. More sodium bicarbonate (10 g.) was added and also anhydrous sodium sulfate (10 g.), followed by sparging at 100° C. and filtration. Clear chloromethylmethyl hydrolyzate (68 g., 78% yield) was obtained.

A mixture of this chloromethylmethylsiloxane (12.0 g., 0.11 mole of $ClCH_2SiMeO$), $Me_3SiO(MeHSiO)_{38}SiMe_3$ (2.1 g., 0.034 mole of SiH), cyclic $He_2SiO$ (17.5 g., 0.24 mole of $Me_2SiO$), $Me_3SiOMe_3$ (0.9 g.) and concentrated sulfuric acid (1.0 g.) was stirred 16 hours at 25° C. The equilibrate was stirred an hour with sodium bicarbonate (7 g.) and filtered. The product was a clear, colorless liquid which by alkaline analysis gave 27.4 cubic centimeters of hydrogen per gram. It had the following composition:

$$Me_3SiO(Me_2SiO)_{42}(MeHSiO)_7(ClCH_2SiMeO)_{29}SiMe_3$$

A mixture of this hydrosiloxane (12.9 g., 0.016 mole of SiH), a polyether of composition $$MeO(C_3H_6O)_{29}(C_2H_4O)_{20}CH_2CH=CH_2$$

69.1 g., 0.018 mole of allyl), toluene (40 g.) and chloroplatinic acid (25 parts per million platinum based on reactants) were heated at 90° C. until all SiH had reacted. The product was a liquid copolymer having the following composition:

$$Me_3SiOMe_2SiO)_{42}[MeO(C_3H_6O)_{29}(C_2H_4O)_{20}$$
$$C_3H_6SiMeO]_7(ClCH_2SiMeO)_{20}SiMe_3$$

This copolymer is referred to herein as "Copolymer III."

EXAMPLE 5

A mixture of cyclic siloxane of composition $$[(ClC_3H_6SiMeO)_1(Me_2SiO)_3]_x$$

(74.2 g., 0.21 mole of $[(ClC_3H_6SiMeO)_1(Me_2SiO)_3]_x$, cyclic $Me_2SiO$ (16.7 g., 0.22 equivalent), $$Me_3SiO(MeHSiO)_{38}SiMe_3$$

(6.3 g., 0.10 equivalent of SiH), $Me_3SiOSiMe_3$ (2.8 g.) and concentrated sulfuric acid (2.5 g.) was stirred 16 hours at room temperature. The equilibrate was neutralized with sodium bicarbonate and filtered. By analysis the colorless liquid product contained one equivalent of SiH per 949 grams. The composition was:

$$Me_3SiO(Me_2SiO)_{49}(MeHSiO)_6(ClC_3H_6SiMeO)_{12}SiMe_3$$

A mixture of this chloropropyl-modified fluid (14.5 g., 0.015 equivalents of SiH), the polyether of Example 1 (60.5 g., 0.018 equivalents of allyl), toluene (35 g.) and chloroplatinic acid (35 parts per million platinum based on reactants) were heated at 90° C. until all silanic hydrogen had reacted. Sodium bicarbonate was added, solvent sparged off with nitrogen and the mixture filtered. The product copolymer had a viscosity of 2878 centistokes and had the following composition:

$$Me_3SiO(Me_2SiO)_{49}[MeO(C_3H_6O)_{29}(C_2H_4O)_{20}$$
$$C_3H_6SiMeO]_6(ClC_3SiMeO)_{12}SiMe_3$$

This copolymer is referred to herein as "Copolymer II."

EXAMPLE 6

A mixture of $(Et_2SioO)_3$ (90.0 g., 0.30 mole), $$Me_3SiO(MeHSiO)_{38}SiMe_3$$

(6.3 g., 0.1 mole of SiH), $Me_3SiOSiMe_3$ (2.8 g.) and concentrated sulfuric acid (2.0 g.) were stirred 16 hours at room temperature, neutralized with sodium bicarbonate and filtered. The product has a viscosity of 218 centistokes at 25° C. It had the following composition:

$$Me_3SiO(MeHSiO)_6(Et_2SiO)_{52}SiMe_3$$

A copolymer was prepared by heating a mixture of this SiH fluid (14.6 g., 0.015 mole of SiH), the polyether of Example 1 (60.4 g., 0.018 mole of allyl), toluene (120 g.) and chloroplatinic acid (30 parts per million platinum based on reactants) until essentially all SiH had reacted. Sodium bicarbonate was added, the reaction mixture sparged with nitrogen and filtered. A liquid copolymer was obtained which had the following composition:

$$Me_3SiO[MeO(C_3H_6O)_{29}(C_2H_4O)_{20}$$
$$C_3H_6SiMeO]_6(Et_2SiO)_{52}SiMe_3$$

This copolymer is referred to herein as "Copolymer VII."

EXAMPLE 7

The polyether of Example 1 (59.7 g., 0.014 mole of allyl) containing chloroplatinic acid (75 parts per million platinum based on reactants) was added dropwise to a solution of a hydrosiloxane of composition $$Me_3SiO(Me_2SiO)_{96}(MeHSiO)_{34}SiMe_3$$

(15.3 g. 0.056 mole of SiH) in toluene (125 g.) containing chloroplatinic acid (75 parts per million platinum based on reactants) at 80–85° C. During the addition the rate was such that the reaction mixture remained clear. Ethylidenenorbornene (6.2 g., 0.052 mole) was added and the reaction temperature maintained at about 100° C. After three hours reaction of SiH was complete. Sodium bicarbonate was added, the mixture sparged with nitrogen and finally filtered. The clear liquid copolymer had a viscosity of 5340 centistokes at 25° C. It had the following composition:

$$Me_3SiO(Me_2SiO)_{96}[MeO(C_3H_6O)_{29}(C_2H_4O)_{20}$$
$$C_3H_6SiMeO]_8(CH_3CH=C_7H_9SiMeO)_{26}SiMe_3$$

This copolymer is referred to herein as "Copolymer IX."

EXAMPLE 8

To the ethylidenenorbornene modified copolymer of Example 7 (10.0 g., 0.002 mole of ethylidene groups) in 60 milliliters of carbon tetrachloride was added dropwise bromine (2.0 g., 0.013 mole of $Br_2$) in 20 milliliters of carbon tetrachloride at room temperature. During most of the addition a yellow color initially formed by quickly fading after each incremental addition. Finally the yellow color persisted, indicating saturation of the double bond. Sodium bicarbonate (2 g.) was added, and also $HO(C_2H_4O)_x(C_3H_6O)_yC_4H_9$ having a viscosity of 660 SUS. (8.1 g.), the latter to increase the volume for more convenient handling of the product during processing. The mixture was sparged with nitrogen to 100° C. and filtered. The product was a liquid copolymer, clear and light yellow, which had the following composition:

$$Me_3SiO(Me_2SiO)_{96}[MeO(C_3H_6O)_{29}(C_2H_4O)_{20}$$
$$C_3H_6SiMe]_8(CH_3CHBrC_7H_9BrSiMeO)_{26}SiMe_3$$

This copolymer is referred to herein as "Copolymer VIII."

Examples 9 and 10 below, show the properties of foams produced in accordance with the process of this invention as compared to other foams.

The foams were produced from the following materials:

| Material | Parts by weight | Grams |
|---|---|---|
| Polyether polyol having a hydroxyl number of 56 produced by reacting glycerol and propylene oxide | 100 | 350 |
| Tris(beta-chloroethyl)phosphate (flame retardant) | 10 | 35.0 |
| Water | 4.0 | 14 |
| N,N-dimethyl-2-[dimethylaminoethoxy]ethylamine (catalyst) | 0.1 | 0.35 |
| Stannous octoate (catalyst) | 0.4 | 1.4 |
| A mixture of 80 wt. percent 2,4-tolylene diisocyanate and 20 wt. percent 2,6-tolylene diisocyanate | (a) | (a) |
| Ether solvent solution of block copolymer c | (b) | | a 108 index.
b 1.2 in Example 9; as indicated in Example 10.
c In all cases the block copolymer was used in the form of a solvent solution containing 55 wt. percent block copolymer and 45 wt. percent of an ether solvent mixture consisting of 90 wt. percent $C_4H_9O(C_2H_4O)_{11}$-$(C_3H_6O)_8H$ and 10 wt. percent $C_9H_{19}C_6H_4O(C_2H_4O)_{20.5}H$.

The foams described in the following examples were prepared as follows:

(a) Dispense 350 grams of the polyol into a Lily Cup No. 32TN6.

(b) Add 35 grams of the flame retardant to the polyol and disperse with spatula.

(c) Using a 5 cc. syringe, add the block copolymer to the structure produced in (b) and disperse with spatula.

(d) Insert baffle.

(e) Add 14.35 cc. of a premixture of the water and the catalyst [1] to the solution produced in (c). Do not disperse.

(f) Place container under drill press and agitate 15 seconds at 2000 revolutions per minute and stop. Do not remove from drill press.

(g) Add 1.12 cubic centimeters of catalyst [2] using a 1 cc. syringe.

(h) Mix 8 seconds, then without stopping drill press, add rapidly 179.5 grams of the mixture of diisocyanates. Continue agitation for 7 seconds.

(i) After the mixing cycle, pour into a 12″ x 12″ x 12″ parchment lined cake box supported by a wooden mold.

(j) Allow foam to rest in wooden mold for at least 3 minutes. This is to avoid the dense ridge that will ap-

[1] Amine.  [2] Tin.

pear if the cake box is removed from the wooden mold when the foam is green.

(k) Cure 15 minutes at 130° C.

(l) Cut foam and measure rise, breathability, and burning extent.

The terms "rise," "burning extent" and "breathability" used in Examples 9 and 10 below have the following meanings:

"Rise" denotes the foam height. Rise is directly proportional to surfactant potency.

"Burning extent" denotes the burned length of a test specimen of foam measured in accordance with ASTM D–1692–67T. The flammability of a foam is proportioned to its burning extent as measured by this test.

"Breathability" denotes the porosity of a foam and is roughly proportional to the number of open cells in a foam. Breathability is measured as follows: A 2" x 2" x 1" piece of foam is cut from near the center of the bun. Using a Nopco Foam Breathability Tester, Type GP-2 Model 40GD10, air is drawn through the 1" portion at a pressure differential of 0.5 inch of water less than atmospheric pressure. The air flow is parallel to direction of original foam rise. The degree of openness of the foam (or foam breathability) is measured by air flow and is designated as standard cubic feet per minute.

EXAMPLE 9

The burning extent, rise and breathability of foams produced using several block copolymers employed in the process of this invention (Copolymers I through IX) and foams produced using several other copolymers (Copolymers A through E) were measured. The results are shown below:

| Copolymer | Burning extent (inches) | Rise (inches) | Breathability (ft.³/min.) |
|---|---|---|---|
| I | 1.28 | 7.2 | 4.5 |
| II | 1.48 | 7.8 | 2.5 |
| III | 1.48 | 7.8 | 2.0 |
| IV | 1.60 | 7.9 | 3.0 |
| V | 1.61 | 7.8 | 3.5 |
| VI | 1.86 | 7.6 | 2.9 |
| VII | 2.13 | 6.9 | 4.3 |
| VIII | 2.52 | 7.4 | 0.7 |
| IX | 2.71 | 7.8 | 1.4 |
| A | Foam collapsed | | |
| B | 2.02 | 8.0 | 0.2 |
| C | 2.17 | 7.9 | 0.2 |
| D | Foam collapsed | | |
| E | 4.01 | 7.9 | 2.2 |
| G | <5 | 7.9 | 1.2 |

The above results illustrate that decreased flammability (decreased burning extent) of foams is achieved in accordance with the process of this invention without impairment of rise and breathability.

EXAMPLE 10

The burning extent and breathability of foams produced using two block copolymers employed in the process of this invention (Copolymers X and XI) and of foam produced using two other copolymers (Copolymers E and F) were measured at three copolymer concentrations. The results obtained are shown below:

| | Burning extent at three concentrations | | | Breathability at three concentrations | | |
|---|---|---|---|---|---|---|
| Concentration | 0.6 | 1.2 | 2.0 | 0.6 | 1.2 | 2.0 |
| Copolymer: | | | | | | |
| X | 2.1 | 2.0 | 1.9 | 3.0 | 2.9 | 2.1 |
| XI | 2.0 | 1.8 | 1.6 | 3.3 | 2.9 | 2.1 |
| E | 2.8 | 3.8 | >5.0 | 3.4 | 2.4 | 1.0 |
| F | 2.7 | 3.4 | 4.3 | 4.2 | 1.8 | 0.7 |

The above results illustrate that the foams produced using Copolymers X and XI were less flammable (decreased burning extent) and exhibited less change in burning extent and breathability with concentration than foams produced with Copolymers E and F.

EXAMPLE 11

The bulk surface tension of the parent siloxanes of some of the above-described copolymers and of some of the copolymers themselves were as follows:

| | Bulk surface tension (dynes/cm. at 25° C.) | |
|---|---|---|
| Copolymer | Block copolymer | Parent siloxane |
| I | | 23.6 |
| II | 23.9 | 22.9 |
| III | | 20.9 |
| IV | 24.1 | 23.1 |
| V | 22.9 | 22.1 |
| VII | | 23.6 |
| IX | 23.6 | |
| XII | 24.1 | |
| XIII | 26.8 | |
| A | | 25.1 |
| D | 32.6 | 26.8 |
| E | 21.1 | 20.2 |
| G | 20.4 | 20.2 |

What is claimed is:

1. A process for producing an open-cell flexible polyether polyurethane foam which comprises simultaneously reacting and foaming a mixture of (a) polyether polyurethane-forming reactants, (b) a catalyst for the reaction of (a) to produce the polyether polyurethane, (c) a blowing agent, and (d) a siloxane-polyoxyalkylene block copolymer foam stabilizer represented by the average formula,

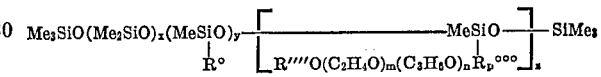

wherein: Me is methyl; $R^{\circ\circ\circ}$ is an alkylene group, an -alkylene-CO- group where the free valence of alkylene is attached to the silicon atom, or an -alkylene-NHCO- group where the free valence of alkylene is attached to the silicon atom; $x$ has a value from 40 to 96; $y$ has a value from 9 to 28; $z$ has a value from 3.3 to 7; $p$ is 0 or 1; $m$ has a value from 0 to 100, $n$ has a value from 0 to 100, and the sum $m+n$ has a value from 10 to 200; $R^\circ$ is an aralkyl group having no more than 12 carbon atoms; and $R''''$ is hydrogen, an alkyl group or an acyl group.

2. A process as defined in claim 1 wherein the mixture also contains a silicon-free flame retardant.

3. A process as defined in claim 2 wherein the flame retardant is chemically combined in a polyether polyol, a polyisocyanate or a quasi-prepolymer which is a component of the polyether polyurethane-forming reactants.

4. A process as defined in claim 2 wherein the flame retardant is a discrete organic compound containing phosphorus or halogen or both phosphorus and halogen.

5. A process as defined in claim 1 wherein $p$ is one and said $R^{\circ\circ\circ}$ is an alkylene group having three carbon atoms.

6. A flexible polyether polyurethane foam produced by the process of claim 1.

7. A process for producing a flame-retarded, flexible polyether polyurethane which comprises simultaneously reacting and foaming a mixture of (a) a polyether polyol, (b) an aromatic polyisocyanate, (c) a catalyst for the reaction of (a) and (b) to produce the polyether polyurethane, (d) a blowing agent comprising water, (e) a silicon-free flame-retardant, and (f) a siloxane-polyoxyalkylene block copolymer foam stabilizer represented by the average formula,

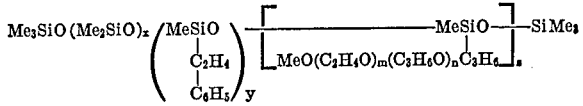

wherein: Me is methyl, $x$ has a value from 42 to 51, $y$ has a value from 9 to 13, $z$ has a value from 4.9 to 7, $m$ has a value from 0 to 100, $n$ has a value from 0 to 100, and the sum $m+n$ has a value from 100 to 200.

8. A flame-retarded, flexible polyether polyurethane produced by the process of claim 7.

9. A process for producing an open-cell flexible polyether polyurethane foam which comprises simultaneously reacting and foaming a mixture of (a) polyether polyurethane-forming reactants, (b) a catalyst for the reaction of (a) to produce the polyether polyurethane, (c) a blowing agent, and (d) a siloxanepolyoxyalkylene block copolymer foam stabilizer represented by the average formula,

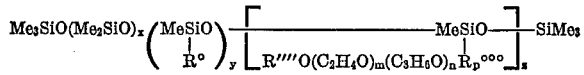

wherein: Me is methyl; $R^{\circ\circ\circ}$ is an alkylene group, an -alkylene-CO- group where the free valence of alkylene is attached to the silicon atom, or an -alkylene-NHCO- group where the free valence of alkylene is attached to the silicon atom; $x$ has a value from 42 to 49; $y$ has a value from 12 to 20; $z$ has a value from 6 to 7; $p$ is 0 or 1; $m$ has a value from 0 to 100, $n$ has a value from 0 to 100, and the sum $m+n$ has a value from 10 to 200; $R°$ is a halogenated alkyl group having no more than 12 carbon atoms; and $R''''$ is hydrogen, an alkyl group or an acyl group.

10. A process for producing an open-cell flexible polyether polyurethane foam which comprises simultaneously reacting and foaming a mixture of (a) polyether polyurethane-forming reactants, (b) a catalyst for the reaction of (a) to produce the polyether polyurethane, (c) a blowing agent, and (d) a siloxanepolyoxyalkylene block copolymer foam stabilizer represented by the average formula,

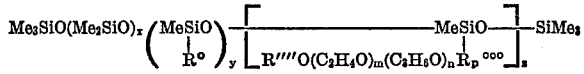

wherein: Me is methyl; $R^{\circ\circ\circ}$ is an alkylene group, an -alkylene-CO- group where the free valence of alkylene is attached to the silicon atom, or an -alkylene-NHCO- group where the free valence of alkylene is attached to the silicon atom; $x$ has a value of 96; $y$ has a value of 26; $z$ has a value of 8; $p$ is 0 or 1; $m$ has a value from 0 to 100, $n$ has a value from 0 to 100, and the sum $m+n$ has a value from 10 to 200; $R°$ is selected from the group consisting of an alkylidene-substituted bicycloheptyl group having no more than 12 carbon atoms and halogenated derivatives thereof; and $R''''$ is hydrogen, an alkyl group or an acyl group.

11. A process for producing an open-cell flexible polyether polyurethane foam which comprises simultaneously reacting and foaming a mixture of (a) polyether polyurethane-foaming reactants, (b) a catalyst for the reaction of (a) to produce the polyether polyurethane, (c) a blowing agent, and (d) a siloxanepolyoxyalkylene block copolymer foam stabilizer represented by the average formula,

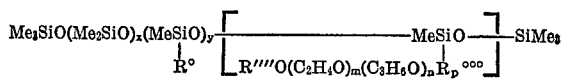

wherein: Me is methyl; $R^{\circ\circ\circ}$ is an alkylene group, an -alkylene-CO- group where the free valence of alkylene is attached to the silicon atom, or an -alkylene-NHCO- group where the free valence of alkylene is attached to the silicon atom; $x$ has a value of 90; $y$ has a value of 29; $z$ has a value of 8; $p$ is 0 to 1; $m$ has a value from 0 to 100, $n$ has a value from 0 to 100, and the sum $m+n$ has a value from 10 to 200; $R°$ is a gramm-glycidoxypropyl group; and $R''''$ is hydrogen, an alkyl group or an acyl group.

References Cited

UNITED STATES PATENTS

| | | | |
|---|---|---|---|
| 3,272,762 | 9/1966 | Ibbotson | 260—2.5 AH |
| 3,471,465 | 10/1969 | Loew | 260—2.5 AH |
| 3,560,544 | 2/1971 | Haluska | 260—2.5 AH |
| 3,300,418 | 1/1967 | Andres | 260—348 SC |

FOREIGN PATENTS

| | | | |
|---|---|---|---|
| 1,036,081 | 7/1966 | Great Britain | 260—348 SC |

DONALD E. CZAJA, Primary Examiner

C. W. IVY, Assistant Examiner

U.S. Cl. X.R.
260—2.5 AJ, 2.5 AP

PO-1050
(5/69)

UNITED STATES PATENT OFFICE
CERTIFICATE OF CORRECTION

Patent No. 3,779,956          Dated     December 18, 1973

Inventor(s)  Edward L. Morehouse

It is certified that error appears in the above-identified patent and that said Letters Patent are hereby corrected as shown below:

Column 1, line 70, "oragnic" should read -- organic --. Column 2, line 29, "collapse" should read -- collapses --; line 46, for "minor" read -- major --; line 46, "(Me$_2$Sio)" should read -- (Me$_2$SiO) --. Columns 3-4, in equation (a) of the table, to the right of the arrow, "$\equiv$C-O-Si" should read -- $\equiv$C-O-Si$\equiv$ --, in equation (d-1), to the right of the arrow, that portion of the formula reading "CHNH" should read -- CNH --; in equation (d-2), to the right of the arrow, that portion of the formula reading "CHN" should read -- CNH --; in equation (d-2), in each of two occurrences, that portion of the formulas reading "(CH$_2$)$^3$" should read -- (CH$_2$)$_3$ --; in equation (k), to the right of the arrow, "COSi$\equiv$" should read -- $\equiv$COSi$\equiv$ -- and "CH$_2$C$_2$OH" should read -- CH$_3$CH$_2$OH --. Column 5, line 44, "there" should read -- three --. Column 6, line 58, "clorendate" should read -- chlorendate --; line 72, "glucerine" should read -- glycerine --. Column 7, line 60, before "propylene glycol" insert -- ethylene glycol, --. Column 10, line 29, that portion of the first formula reading "D$_7$" should read -- D'$_7$ --. Column 12, line 51, that portion of the first formula reading "Ci" should read -- Cl --; line 52, "He$_2$SiO" should read -- Me$_2$SiO --. Column 13, line 33, "(Et$_2$SioO)$_3$" should read -- (Et$_2$SiO)$_3$ --; line 39, "has" should read -- had --. Column 14, line 10, "0.002" should read -- 0.008 --; line 26, that portion of the formula reading "C$_3$H$_6$SiMe]$_8$" should read -- C$_3$H$_6$SiMeO]$_8$ --; line 44, "copolymerc" should read -- copolymer$^c$ --; line 49, in the last line of footnote (c), that portion of the formula reading "(C$_2$H$_4$O)$_{20.5}$" should read -- (C$_2$H$_4$O)$_{10.5}$ --; line 57, for "structure" read -- mixture --. Column 18, lines 12-15, after the bracketed portion of the formula read the subscript -- z --; line 24, "gramm-" should read -- gamma- --.

Signed and sealed this 22nd day of October 1974.

(SEAL)
Attest:

McCOY M. GIBSON JR.
Attesting Officer

C. MARSHALL DANN
Commissioner of Patents